Aug. 23, 1966  J. P. URBON  3,268,382

APPARATUS FOR BUILDING TIRES

Filed Feb. 28, 1962  2 Sheets-Sheet 1

INVENTOR.
JOHN P. URBON

BY

*J. B. Holden*
ATTORNEY

Aug. 23, 1966 J. P. URBON 3,268,382
APPARATUS FOR BUILDING TIRES
Filed Feb. 28, 1962 2 Sheets-Sheet 2
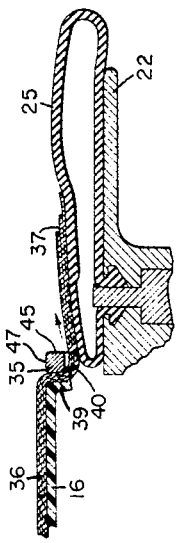
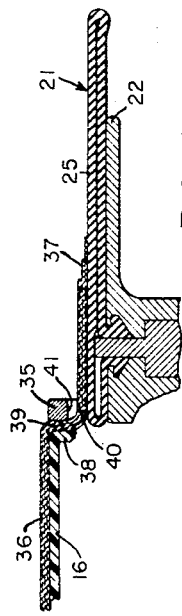
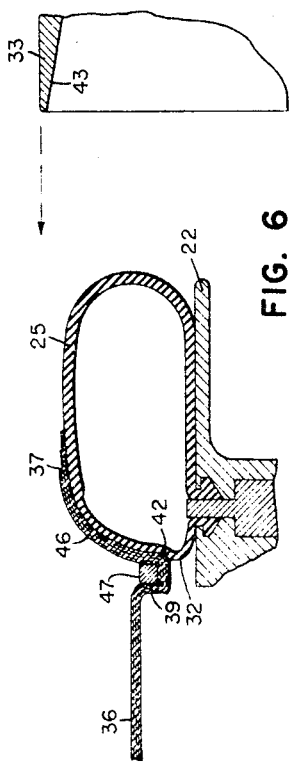
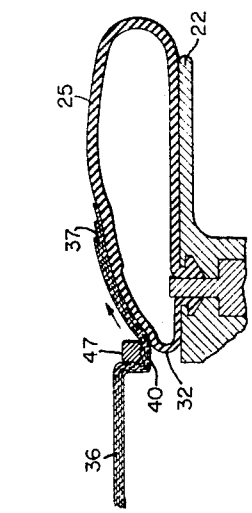
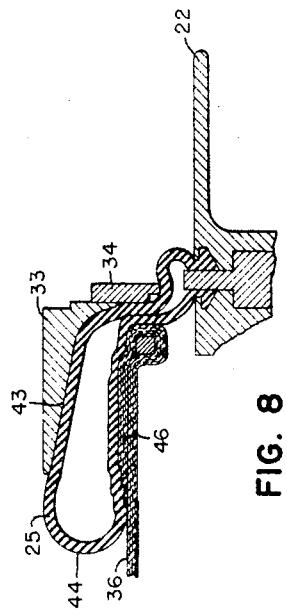
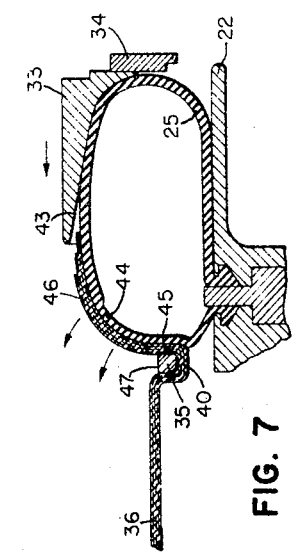
*INVENTOR.*
JOHN P. URBON
BY
*J.B. Holden*
ATTORNEY United States Patent Office 3,268,382
Patented August 23, 1966

3,268,382
APPARATUS FOR BUILDING TIRES
John P. Urbon, Cuyahoga Falls, Ohio, assignor to The Goodyear Tire & Rubber Company, Akron, Ohio, a corporation of Ohio
Filed Feb. 28, 1962, Ser. No. 176,312
6 Claims. (Cl. 156—401)

This invention relates to an apparatus for building tires, and more particularly to improvements to apparatus for building pneumatic tires by the flat band process.

In building or assembling pneumatic tires by the so-called flat band process, ply material consisting of parallel textile or metallic cords embedded in sheet rubber, is wrapped or placed about a substantially cylindrical outer surface of a drum or building form, and the circumferential marginal edges of the ply material are folded radially inward over the ends of the drum or building form. Circular bead rings are then placed against the in-turned edges of the ply material which are then folded about the bead rings to retain the latter in place.

The principal object of this invention is to provide a generally improved apparatus for carrying out such method which is relatively simple in design and construction, and having a drum constructed and designed so as to facilitate removal of the green tires.

A further object of the present invention is to provide automatic means for turning fabric around the bead rings of a tire automatically and simultaneously about the complete circumference thereof while applying an axial tension to the ply endings and to provide for release of the ply endings after the turn up is completed.

Other objects, use and advantages of the invention will become apparent to those skilled in the art from the following description and claims and from the drawings, in which:

FIG. 3 is an enlarged partial sectional view of the drum showing the drum in expanded position;

FIG. 4 is a view similar to FIG. 3 with the ply turn-up bladder in an initial partially inflated position;

FIG. 5 is a view similar to FIG. 4 with the ply turn-up bladder more fully inflated;

FIG. 6 is a view similar to FIG. 5 with a ply turn-up bladder fully inflated;

FIG. 7 is a view similar to FIG. 6 with the cage initially engaging the ply turn-up bladder; and FIG. 8 is a view similar to FIG. 7 with the cage in its axially innermost position.

Referring more particularly to the drawings in which like parts are referred to by the same numerals throughout the several views, a tire building drum 1 is mounted for rotation with a rotatable shaft 2 suitably supported in the frame of the tire building machine, and rotated in either direction by a suitable power unit.

Figure 1:
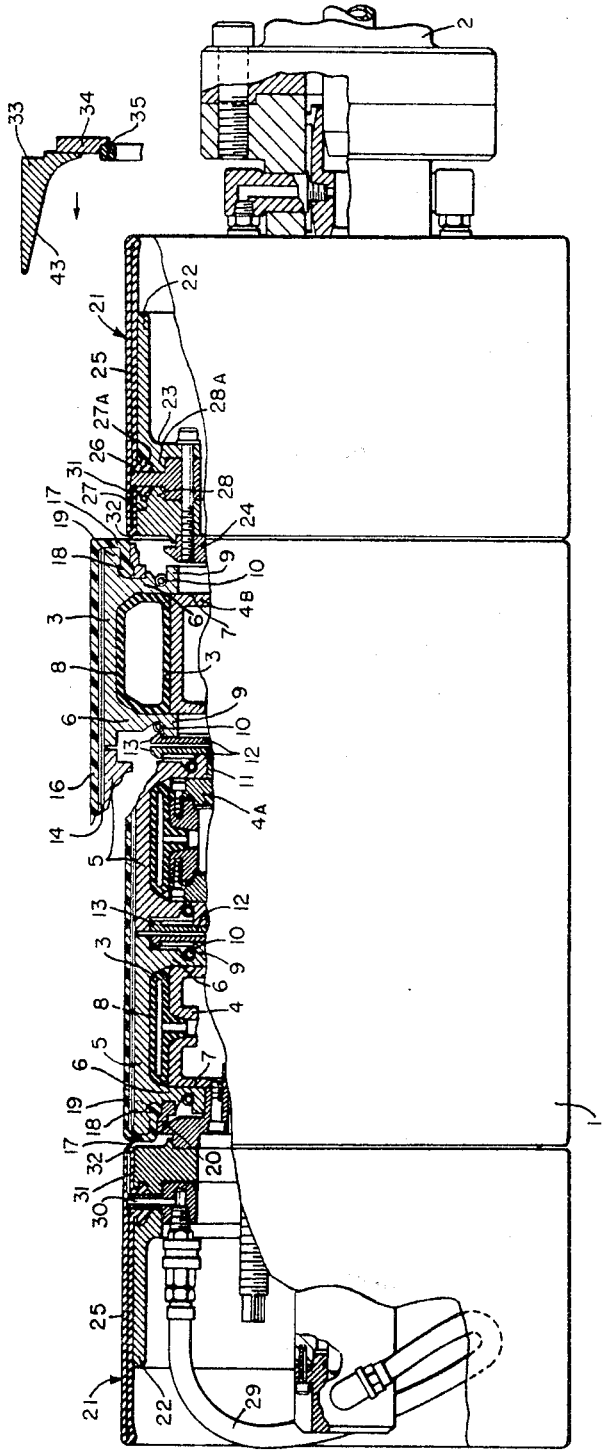
FIG. 1 is a fragmentary longitudinal vertical sectional view of the tire building drum with parts broken away and parts shown in section.

Although the concept of this invention may be used with any expandable tire building drum, the preferred embodiment shall be shown and described as applied to a radially expandable drum 1, such as shown in U.S. patent application Serial No. 835,935, filed August 25, 1959, now U.S. Patent No. 3,078,204 having one or more sections, each of which is radially expandable by means of an annular inflatable bladder 3, which are mounted respectively upon a spider 4, each of which is secured to the shaft 2. Each of the spiders 4 supports a plurality of rigid elongated circumferentially narrow elements 5 having depending radially inwardly extending legs 6 which engage the lateral surface 7 of the spiders 4, 4a and 4b. The elements 5 are provided with a radially inner surface 8 which engages the radially outer surface of the annular bags 3. The depending legs 6 terminate in a flange 9 about which is resiliently held an annularly continuous helical spring 10 which urges the elements 5 radially inwardly. In the unexpanded position as shown in FIG. 1 the flange 9 of each of the elements 5 engages a flange 11 on the members 12. When the drum is in a radially expanded position the flange 9 engages an annular flange 13 on the members 12, which limits the radially outer expansion of the elements 5. It is thus seen that as air pressure is admitted to the annular bladders 3 the bladders expand into toric shape as shown, each of the elements 5 are moved radially outwardly against the pressure of springs 10 until the flanges 9 engage the flanges 11 on the elements 12. In expanded position the elements 5 provide a substantially rigid cylindrical working surface. When the air pressure in the bladders 3 is released the elements 5 are returned to their radially inward position as shown in FIG. 1 by the springs 10.

Figure 2:
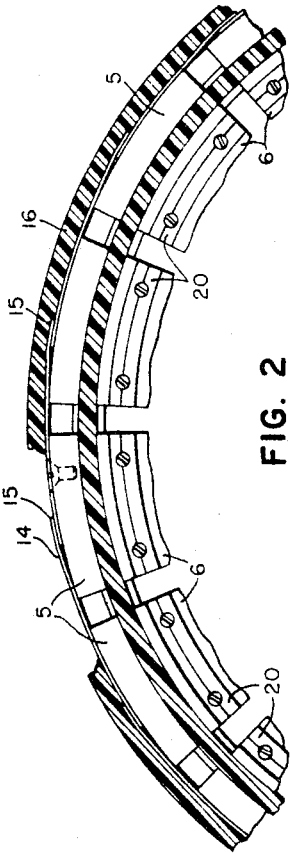
FIG. 2 is an enlarged sectional view taken along the lines 2—2 of FIG. 1.

As shown in FIG. 2 each of the elements 5 is provided with thin metal arcuate shaped cover plates 14 suitably secured thereto and which are coextensive with the complete length of the elements 5. The plates 14 extend circumferentially and beyond the elements 5 into overlapping engagement with adjacent plates, as shown in FIG. 2, and such overlapping relationship is maintained from the expanded to the unexpanded position of the drum. The plates 14 on the elements 5 secured to the spider 4a extend axially therebeyond into an axial overlapping relationship with the plates 14 on spiders 4 and 4b. Since the plates 14 overlap each other in all radial or axial expanded positions of the drum, it is seen that the plates 14 bridge the axially and/or the circumferentially extending gaps which exist between the elements 5 when the drum is expanded.

It is seen that the plates 14 provide a radial and circumferentially continuous rigid work surface on the drum. In order to eliminate any bridging of the tire fabric across the edges 15 of the plates 14 a cylindrical flexible stretchable resilient cover or sleeve 16 which will subsequently be described in greater detail completely encloses the elements 14. The sleeve 16 is provided with radially inwardly extending flanges 17 which terminate in an annular bead 18. The bead 18 is clamped between the surface 19 of the elements 5 and a plate 20 secured to the elements 5.

The cylindrical, flexible, stretchable, resilient sleeve 16 has the following properties: oil-resistant surface, good cut resistance, good flex life, low compression set and a non-sticking surface. Oil resistance is necessary to prevent the sleeve from picking up or absorbing oils or other plasticizers from the tire ply stock. Good cut resistance and flex life are necessary so that the sleeve will have a reasonable service life. Low compression set is needed because the sleeve must be able to assume its original shape when the pressure on it is released so that it will withdraw from the tire ply stock and release the green tire. A non-sticking surface is necessary so that the sleeve will release the tire ply stock after the tire building operations are completed. One of the initial and serious problems encountered with tire building machines having a resilient rubber sleeve was that they required that the sleeve be frequently coated with a powder or wax in order to prevent the tire plies from sticking to the sleeve. In actual practice it has been customary to apply a thin wax coating to the building sleeve before starting construction of each tire. In accordance with the present invention a rubber building sleeve incorporating all of the desirable features of such a sleeve is produced and which has the additional feature of being free from any tendency to stick to the tire ply. A sleeve stock suitable for use in the invention will have the above properties in the ranges listed below:

Oil resistance—Volume change, −10 to +15, after 70 hours at 212° F. (ASTM oil #1)
Modulus—At 300% elongation not over 1000 p.s.i.
Compression set—Not more than 65% after 22 hours at 150° F.
Adhesiveness—No tack.

The properties of the sleeve stock are to some extent relative and some adjustment can be made by making variations in the compounding of the sleeve stock or by making variations in the tire ply stock. It has been found that the properties and characteristics required in order for the sleeve to operate successfully depends on the relationship of the polarity of the rubber in the sleeve to the polarity of the rubber in the tire ply stock. If the polarity of the rubber in the sleeve and the rubber in the ply stock are approximately the same the sleeve will adhere to the tire ply stock and will release the newly built green tire only with difficulty. It was found that when the tire ply stock is made of a rubber which exhibits little or no polarity in the raw state and the sleeve is made of a rubber which exhibits a medium polarity the apparatus will not operate successfully because the adhesive forces between the sleeve and the tire ply stock are too strong and the cover will not readily release the tire ply stock. However, when the rubber in the sleeve and the rubber in the tire ply stock are made of stocks of widely different or extreme polarity there is little tendency for the sleeve to stick to the tire ply stock and the newly built green tire will be released by merely releasing the mechanism holding the sleeve in contact with the tire ply stock.

In one experiment a building sleeve was made of a formulation used for the tire ply stock. This rubber stock exhibited little or no polarity in the cured state. A tire building machine equipped with the above-described building sleeve was used in building tires. After having been used to build two or three tires the sleeve stuck very firmly to the tire ply stock and would not readily release the tire ply stock, causing difficulty in removing the green tire from the drum.

Another building sleeve was made from a butadiene-acrylonitrile rubber according to the following recipe wherein all proportions are expressed as parts by weight. This rubber was highly polar as compared to SBR or natural rubber.

| | |
|---|---|
| Nitrile rubber (55 parts butadiene-45 parts acrylonitrile) | 100.00 |
| Zinc oxide | 5.00 |
| Magnesium carbonate | 1.00 |
| Sulfur | 2.00 |
| Carbon black | 80.00 |
| Stearic acid | 1.00 |
| Di-benzothiazyl disulfide | 1.60 |
| Polyvinyl chloride resin | 20.10 |
| Dioctyl phthalate | 4.15 |
| Tributyl citrate | 4.15 |
| Triglycol ester | 4.15 |
| Dibutyl phthalate | 5.00 |
| | 228.15 |

A sleeve made up of this stock was used successfully on a tire building machine and easily released the tire ply stock 10,000 times without any sticking of the tire ply stock and without requiring any treatment of the sleeve.

The above experiments show that when the tire ply stock is made of a rubber which exhibits little or no polarity in the uncured state, a building sleeve having essentially the same polarity will not perform successfully. However, these tests show that a sleeve made of a rubber having a polarity which is greatly different from that of the tire ply stock performs remarkably well in this invention. Thus when natural, SBR or butyl rubber is used in the tire ply stock a rubber having a high degree of polarity is used in the building sleeve.

The polar properties of a rubber may be qualitatively estimated by determining the type of solvent in which the rubber is soluble. Thus non-polar rubbery materials which contain few or no polar groups dissolve in non-polar solvents such as aliphatic hydrocarbons, aromatic hydrocarbons and similar solvents. On the other hand, highly polar rubbers which contain strong polar groups dissolve more readily in polar solvents such as ketones and esters. A highly polar rubber such as a copolymer of butadiene and acrylonitrile will dissolve in ketones and other active solvents much more readily and to a greater extent than it will in a non-polar solvent. A rubber of intermediate polarity, such as neoprene, dissolves in ketones as well as in chlorinated solvents. In contrast, the non-polar rubbers, such as SBR, butyl and natural rubber, are most soluble in the straight aliphatic and aromatic hydrocarbons.

In considering the polarity of rubbers in more precise terms it has been observed that the polarity of a rubber is closely related to its solubility parameter, thus a highly polar rubber will have a relatively high value for its solubility parameter and a rubber of low polarity will have a relatively low value for its solubility parameter. A recent and most comprehensive article summarizing work done in studying the solubility parameters of some typical rubbers appeared in volume LIV of the "Transactions of the Faraday Society," pages 1731–1741 (1958); G. M. Bristow and W. F. Watson, published by the Aberdeen University Press Ltd. These investigators have found the following values for the solubility parameters of typical rubbers:

| | |
|---|---|
| Natural rubber | 8.1 |
| Butyl rubber | 7.8 |
| Neoprene | 8.6 |
| 96/4 butadiene/styrene | 8.1 |
| 87.5/12.5 butadiene/styrene | 8.1 |
| 71.5/28.5 butadiene/styrene | 8.1 |
| 82/18 butadiene/acrylonitrile | 8.7 |
| 70/30 butadiene/acrylonitrile | 9.9 |
| 61/39 butadiene/acrylonitrile | 10.3 |

Based on the foregoing values for solubility parameters the applicant has observed that those rubbers having a solubility parameter of 8.7 or greater can be considered as highly polar rubbers which will function successfully in a building sleeve in accordance with the present invention. Those rubbers that have a solubility parameter between 8.2 and 8.6 inclusively can be considered as rubbers of medium, or intermediate polarity and those rubbers having solubility parameters less than 8.2 would be considered as low polarity rubbers.

The examples above particularly illustrate a building sleeve with respect to butadiene-acrylonitrile copolymer rubber. However, other rubbers can be used providing they have a sufficiently high polarity.

As shown in FIG. 1 a ply turn-up device 21 is secured to each end of the drum which comprises a rigid cylindrical support 22 having a radially depending flange 23. The axial face of flange 23 engages the annular ring 24 and is suitably secured thereto. An annular inflatable flexible bag 25 which will subsequently be described in greater detail is mounted on the member 22 and in uninflated position the bag 25 has an outer diameter substantially the same as the outer diameter of the drum 1 in unexpanded position. The bag 25 is provided with an annular radially extending circumferentially continuous portion 26 which in cross-section is provided with flanges 27 and 27a engaged by the flanges 28 and 28a of the member 22. A hose 29 communicates with the orifice 30 on the bag 25 to provide air inflation and deflation thereof.

For reasons which will be more fully explained hereinafter the inboard portion 31 of the bag 25, that is the portion of the bag 25 which extends from the orifice 30 to the inboard end 32, is made of material which is more flexible than the outboard or remaining portion of the bag. The bag 25 is flat when uninflated and is inflatable into a toric shape. Preferably, the bag 25 is made of an elastomeric material having a medium polarity, such as neoprene rubber and is reinforced with two plies of textile cords extending on a bias relative to the circumference of the bag 25 and preferably including two such reinforcing plies which extend at cross angles relative to each other. The bias angle of the cords is such that when the bag is inflated it will be maintained by such cords in a substantially elliptical shape.

The ply turn-up bladder 25 has the following properties: oil-resistant surface, low modulus, good cut resistance, good flex life, low compression set and a non-sticking surface. Oil resistance is necessary to prevent the bladder from picking up or absorbing oils or other plasticizers from the tire ply stock. Low modulus is required to insure that the bladder will have sufficient flexibility to press on all of the exposed surface of the turned up ply even though the contour or surface of the ply stock contains irregularities. Good cut resistance and flex life are necessary so that the bladder will have a reasonable service life. Low compression set is needed because the bladder must be able to assume its original shape when it is withdrawn from contact with the ply stock and is in an unstretched state. A relatively non-sticking surface is necessary so that the bladder will release the turned up ply stock and will not unfold it after the turning up and pressing down operations are completed. Although a relatively non-sticking surface is required there should be sufficient attractive forces between the bladder and the ply stock that initially the bladder frictionally holds the ply stock and maintains it in a taut state so that it is pulled axially of the bead ring prior to contact thereto. Thus, no wrinkles are formed in the ply ending at the radially inner facing surface of the bead ring as will be more fully explained. A bladder stock suitable for use in the invention will have the above properties in the ranges listed below when cured.

Oil resistance—Volume change −10 to +15, after 70 hours @ 212° F., ASTM Oil #1.
Modulus—At 300% elongation not over 1000 p.s.i.
Compression set—Not more than 65% after 22 hours @ 158° F.
Adhesiveness—No tack.

The desired properties of the bladder stock are to some extent relative and some adjustment can be made by making variations in the compounding of the bladder stock or by making variations in the compounding of the tire ply stock. However, it has been found that the properties and characteristics required for the bladder of the invention to operate successfully depend on the relationship of the polarity of the rubber in the bladder to the polarity of the rubber in the tire ply stock. If the polarity to the rubber in the cured bladder and the uncured rubber in the tire ply stock are approximately the same, the bladder will adhere tightly to the tire ply stock. Under these conditions it will be very difficult to remove the bladder from contact with the tire ply without unfolding the tire ply. When the rubber in the bladder and the rubber in the tire ply stock are of widely different polarity there is little tendency for the bladder to hold the ply stock and make it taut so that the ply can be folded down smoothly around the bead. The result of using stocks of these widely different polarities is that the tire ply stock cannot be folded down without considerable wrinkling occurring. It was found that when the tire ply stock is made of a rubber which exhibits a low polarity in the uncured state and the bladder is made of a rubber which exhibits a medium or intermediate polarity in the cured state the apparatus operates successfully and the bladder will fold over the tire ply stock under sufficient tension, press it down tightly and then release the ply when pressure is removed from the bladder. By the term rubber which exhibits a medium or intermediate polarity is meant those rubbers which have a polarity which is intermediate between the highly polar rubbers such as butadiene-acrylonitrile copolymers and the low polarity rubbers such as natural and SBR rubbers. Thus, medium polarity is required in the bladder if the tire ply stock has a low polarity so that the two rubbers will hold to each other sufficiently to permit the tire ply stock to be pulled out and pressed down tightly without wrinkles and the bladder withdrawn without unfolding of the folded over tire ply.

The following examples illustrate the invention: Ply stock for a tire was made according to the following receipe wherein all proportions are expressed as parts by weight.

*Tire ply stock*

| | |
|---|---|
| Natural rubber | 100.00 |
| Stearic acid | 2.00 |
| Carbon black | 30.00 |
| Dibenzothiazyl disulfide | .50 |
| Mercapto benzothiazole | .75 |
| Diphenyl guanidine | .30 |
| Zinc oxide | 3.00 |
| Sulfur | 2.75 |
| Rosin oil | 7.50 |
| Medium process oil (mineral oil) | 5.00 |
| | 151.80 |

The natural rubber is placed in a Banbury internal mixer along with the compounding ingredients listed above and mixed into a homogeneous blend. The rubber may also be placed on a warm-up mill and mixed with these ingredients until a band and a rolling bank of rubber is established. The rosin oil and the medium process oil are used as a fabricating aid since they help to soften and give tack to the compounded rubber. The rosin oil is a well known ingredient having a specific gravity of 1.02, a saponification number of 110 and an acid number of 85. Commercially, the rosin oil is sold as Sonastac 7L by the Southern Naval Stores, a division of Leach Brothers. The medium process oil is a mineral oil having a specific gravity of .900, a Saybolt (SUS 100° F.) value of 108 seconds and an aniline point of 170° F. It is sold commercially by the Atlantic Refining Company as Coporal Oil B.

In one experiment a two ply turn-up bladder was made using the same formulation that was used for the tire ply stock above except that about 40 parts of carbon black were used instead of 30 as above. This stock exhibits little or no polarity in the cured state.

After being used to turn up plies of the above tire ply stock two or three times the turn-up bladder stuck to the tire ply stock and unfolded the turned down tire ply stock.

Another turn-up bladder was made using neoprene rubber compounded according to the following recipe wherein al proportions are expressed as parts by weight:

| | |
|---|---|
| Neoprene GN–A | 100.00 |
| High grade clay | 40.00 |
| Titanium dioxide | 10.00 |
| Magnesium oxide | 4.00 |
| Zinc oxide | 1.00 |
| Vulcanized rape seed oil | 20.00 |
| Stearic acid | 1.00 |
| Phenyl-alpha-naphthalamine | 1.00 |
| Butoxy ethyl adipate | 5.00 |
| Light processing oil | 20.00 |
| | 202.00 |

This neoprene rubber stock had a medium polarity in the cured state. A bladder made of this neoprene stock was used on a tire building machine to turn up plies of the tire ply stock disclosed above. The machine equipped with this bladder successfully turned up and smoothly folded the ply stock 10,000 times without any unfolding of the tire ply stock when the bladder was withdrawn.

The above experiments show that when the turn-up bladder is made of a rubber having essentially the same polarity as the tire ply stock it will not perform successfully. However, a bladder made of a rubber having medium polarity performs remarkably well in the invention.

The examples above particularly illustrate the invention with respect to neoprene. However, other rubbers can be used. Representative examples of such rubbers are blends of Buna-N and Buna-S, blends of Buna-N and polyvinyl chloride, blends of Buna-N and halogenated natural rubber and hypalon.

For the purpose of this invention neoprene and rubbers which exhibit similar solubility and polar characteristics are classified as medium polarity rubbers.

The polar properties of a rubber for use in the turn-up bladder may be determined by determining the type of solvent in which the rubber is soluble as indicated in the discussion above concerning the rubbers that are useful in the building sleeve. More specifically, the turn-up bladder can be produced from any rubber that has a solubility parameter between 8.2 and 8.6 inclusively as determined by the procedure outlined in the Bristow and Watson article referred to above.

It will be understood by those skilled in the art that although the building sleeve and the turn-up bladder have been described respectively with respect to making these articles entirely out of one stock it is the surface of the sleeve and the bladder that are of major importance. For example, a natural rubber building sleeve or turn-up bladder could be faced or coated with a thin coat of a suitable rubber having the desired polarity and it would perform satisfactorily, or the plates 14 of the drum could be coated with a thin coat of a suitable rubber having the desired polarity.

The plies are turned around the beads by means of ply turn-up devices 21 by rolling the bladders 25 thereof upon themselves as shown in FIGS. 3 through 8. Such movement or rolling of the bladders is accomplished by a combination restricting and pushing member 33, movable axially to and fro relative to each end of the drum 1.

Each of the restricting and pushing members 33 support bead holder 34, which engages the radially outer periphery 47 of the bead and a surface which engages the axially outer surface 45 of the bead.

With the machine elements in the position shown in FIG. 1, the operation of the machine is as hereinafter described. The operator places a bead ring 35 into engagement with the bead holders 34. Layers or plies 36 of rubberized tire fabric are placed around the drum 1 with bias cuts in each layer opposed or crossing each other. The fabric usually consists of cotton, rayon or nylon cord impregnated with rubber compound so that it is sticky or tacky and each layer sticks readily to the adjacent one. The layers or plies of rubberized tire fabric are positioned on the drum so that the endings 37 extend beyond the shoulder 38 of the drum and overlie the bladder or bags 25 as shown in FIG. 3 of the drawings. The drum is then expanded and the fabric layers are stretched and wrapped or forced together to eliminate any bumps, ridges or air pockets and to form a shoulder 39 in the plies as shown in FIG. 3 of the drawings.

After the fabric layers have been placed around the drum, and the drum expanded, the beads 35 are placed against the shoulder 39 formed in the fabric. Because the entire surface including the shoulders 38 of the drum are covered with the yieldable cover 16 which bridges any gaps formed by the overlapping plates 14 the plies 36 may be firmly stitched together across the entire face thereof and at the shoulder 39 without entrapping air between the plies and between the laminated plies and the cover 16.

With the fabric end portions 37 extending axially of the drum and overlying the turn-up bladder 25 air is admitted to the orifices 30 and inflation of the bags 25 are simultaneously initiated. Since the inboard end 31 of the bags 25 is substantially thinner than the thickness of the remaining portion thereof, and therefore more flexible, the initial inflation of the turn-up bags 25 causes it to move axially away from the center of the drum 1 in the direction of the arrow shown in FIG. 4. The initial inflation actually causes the bags 25 to decrease in sectional length, as the bags are inflated but, the flexible inboard portion 31 moves substantially more rapidly towards the center of the bags 25 as it is moved simultaneously radially outward. This action of the bags 25 places a tension on the ply endings 37, and in fact, the plies are tensioned or pulled away from the center of the drum, as the ply endings 37 are expanded from the position shown in FIG. 3 to the position shown in FIG. 5. During this radial expansion the frictional forces between the ply endings 37 and the bags 25 is substantially increased as is the axial force applied to the endings 37. Therefore, the portion 40 of the ply ending underlying the base 41 of the bead ring 35 is stitched to the base 41 as shown in FIG. 5 with a substantial simultaneous and uniform tension applied thereto. The stitching of the portion 40 of the plies occurs simultaneously and uniformly throughout the entire circumference of the ply ending and simultaneously across the base 41 of both bead rings 35.

As the turn-up bags 25 continue to inflate up to a pressure of approximately 16 p.s.i., the bags reach a state of equilibrium. That is, the inflating pressure expands the bags to the shape shown in FIG. 6 wherein the bias cords in the bags have reached a point of equilibrium with the expansion force. The portion 32 of the bag is snubbed under the corner 42 of the bead and the bag has assumed a substantially bulbous shape having a maximum diameter slightly less than the maximum inner diameter of the restraining and pushing members 33.

After the bladders have been fully inflated, the pusher members 33 are moved simultaneously towards the center of the drum. The radially inner surface 43 of the restraining member 33 is slightly conical in shape. The outer surface of the bag 25 outboard of the ply ending is engaged by the surfaces 43, the member 33 is moved axially in the direction shown by the arrow in FIG. 7 and the bag 25 bulges radially outward in front of the member 33. The portion 44 is therefore freely rolled against the axially outer facing surface 45 of the bead with a considerable tension being applied to the fabric ending 37 so that the ending is stitched against the face 45 with considerable pressure. As the restraining member 33 continues in its axial movement towards the center of the drum 1, the marginal edge 46 thereof is continuously and uniformly rolled and stiched against the radially outer surface 47 of the bead and across the shoulder and end portion of the drum into overlapping engagement with the underlying ply material.

The pushers 33 then retract simultaneously away from the center of the drum to the position shown in FIG. 1 and the bags 25 readily release from the green tire and return to their original position. The drum 1 is then contracted to the position shown in FIG. 1 and the green tire removed.

While certain representative embodiments and details have been shown for the purpose of illustrating the invention it will be apparent to those skilled in this art that various changes and modifications may be made therein without departing from the spirit or scope of the invention.

I claim:

1. In combination in a tire building machine a rotatable tire building drum axially mounted on a shaft, said drum having a resilient, expansible, flexible, elastomeric surface of an elastomeric material which has an extreme polarity, a solubility parameter the slope of which is at least 8.7, a drum expanding means to expand the drum and a ply turn-up mechanism mounted on a support at each end of the drum and axially aligned with said drum to turn up ply endings, said ply turn up mechaism having its ply contacting surface made of an elastomeric material which has a solubility parameter the slope of which is from 8.2 to 8.6.

2. In a tire building machine, a tire building drum having an elastomeric surface formed of an elastomer which has a solubility parameter the slope of which is at least 8.7.

3. In a tire building machine having a radially expandable drum mounted on a shaft comprising a plurality of expandable sections coaxially arranged on the shaft, each section having a multiplicity of elements collectively defining a cylindrical surface and a resilient expansible flexible envelope engaging the external surface of said overlapping plates having radially extending annular flanges extending around the shoulder of the drum whereby the work surface of the drum is gapless and rigidly supported during all radially expanded positions of the drum, the improvement which comprises using as said resilient expansible envelope an elastomeric material which has a solubility parameter the slope of which is at least 8.7.

4. The tire drum of claim 2 in which the elastomeric material is a rubber butadiene-acrylonitrile copolymer.

5. In a tire building machine having a tire building drum and a ply turn-up mechanism which comprises a ply turn-up mechanism having a resilient, flexible, elastomeric member which engages the radially inner surface of the marginal edge portion of a tire ply stock on the drum and moves the marginal edge portion axially away from the drum to axially tension each portion and turn the edge portion of a tire, fold and stitch down such edge portion the improvement which comprises using as the elastomeric member of the ply turn up mechanism an elastomer which has a solubility parameter the slope of which is from 8.2 to 8.6.

6. The apparatus of claim 5 in which the resilient flexible elastomeric member of the ply turn-up mechanism is made of neoprene rubber.

References Cited by the Examiner
UNITED STATES PATENTS

| | | | |
|---|---|---|---|
| 3,077,917 | 2/1963 | Appleby | 156—401 |
| 3,078,204 | 2/1963 | Appleby | 156—401 |
| 3,097,985 | 7/1963 | Heuze | 156—401 |
| 3,101,289 | 8/1963 | Giletta et al. | 156—401 |

EARL M. BERGERT, *Primary Examiner.*

HAROLD ANSHER, ALEXANDER WYMAN,
*Examiners.*